Jan. 3, 1956     K. MAYBACH ET AL     2,729,117
MULTICRANK DRIVING MECHANISM FOR INTERNAL-COMBUSTION ENGINES
Filed Aug. 7, 1951
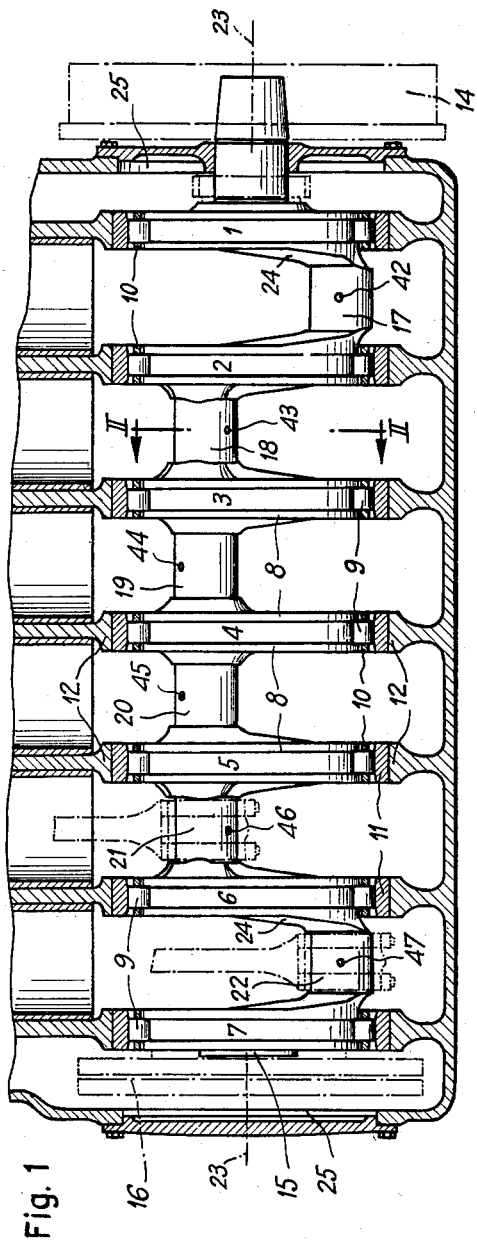
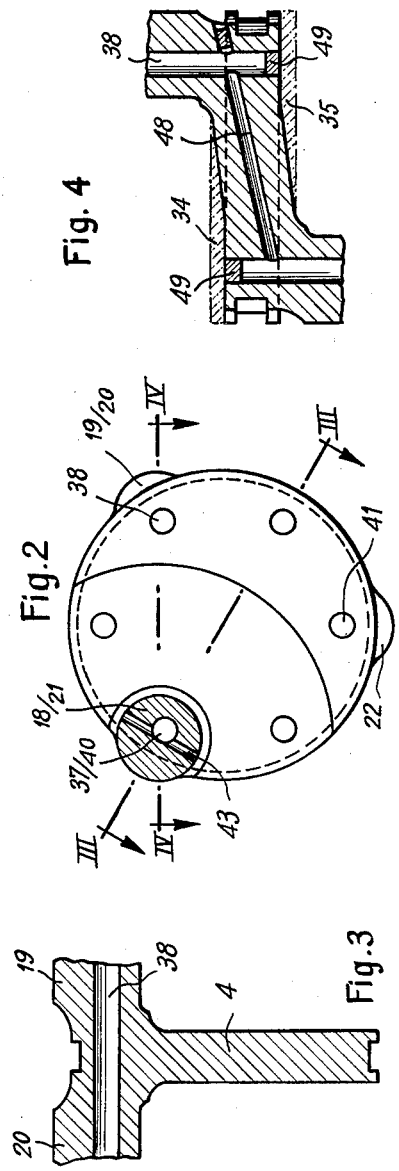
Inventors
Karl Maybach and
Richard Seifert
by [signature], atty.

United States Patent Office 2,729,117
Patented Jan. 3, 1956

2,729,117

MULTICRANK DRIVING MECHANISM FOR INTERNAL-COMBUSTION ENGINES

Karl Maybach, Friedrichshafen (Bodensee), and Richard Seifert, Friedrichshafen (Seemoos), Germany, assignors, by direct and mesne assignments, to Maybach-Motorenbau G. m. b. H., Friedrichshafen, Germany, a firm of Germany Application August 7, 1951, Serial No. 240,654

Claims priority, application Germany October 3, 1950

2 Claims. (Cl. 74—596)

This invention relates to multi-crank driving mechanism adapted for use in multi-cylinder internal combustion engines.

It is an object of this invention to provide a multi-crank shaft which offers very material advantages both as to weight and rigidity and to the cost of manufacture and which owing to its extraordinary rigidity is particularly fit for use in the engines of diesel locomotives and rail motor cars.

It is a further object of this invention to provide a combination of a one-piece multi-crank shaft and a crank-case supporting same which allows of assembling the shaft with, and disengaging same from, the crank case by a simple straight-line movement of the shaft in axial direction.

It is still another object of the invention to provide a one-piece crank shaft formed with disc-shaped cheeks, supported in antifriction bearings, which operates in an undivided crank case, for such a combination offers the maximum obtainable of mechanical strength and all-over rigidity, accompanied by the lightest possible weight, and ensures a smooth, oscillation-free operation of the engine.

We have succeeded in designing a combination of a multi-crank shaft and its crank case which offers all these advantages, by forming the crank case with an entrance opening of greater diameter than the largest disc-cheek of the shaft and with bearings for the shaft so dimensioned as to allow the entire row of crank cheeks of the shaft and the antifriction bearings surrounding them to pass freely through the entrance opening and through all the bearings provided in the crank case casting preceding the bearing allotted to it.

In order to keep the first cost of the shaft manufacture as low as possible, we prefer fitting the shaft with crank cheeks and antifriction bearings of uniform diameter throughout.

Obviously the crank pins between the disc-cheeks should nowhere extend beyond the (hypothetical) circle centered in the revolution axis of the shaft which equals the largest case bearing.

We are aware that multi-crank shafts for internal combustion engines have already been mounted in the crank case by means of antifriction bearings. Shafts of this type comprising disc-form cheeks have also been proposed. However, shafts of this description, if made all in one piece, would have to be supported in large-diameter bearings and in big and heavy crank cases. In order to insert the antifriction bearings in all supports of the crank case, the shafts as hitherto designed had to be divided into a great number of individual parts which had to be connected by means of a great number of screw bolts. Apart from these obstacles, the known multicrank shafts were formed with cheeks of widely differing diameters and supported in crank case bearings equally differing in diameter and rendering insertion and withdrawal of the shaft by a straight-line axial movement impossible, and therefore required the crank case to be divided and thereby deprived of much of the desirable rigidity and strength.

In the shaft and crank case according to this invention the shaft is a one-piece multi-crank shaft and the crank case may be a one-piece casting. As will appear from the detailed description of the parts constituting the invention, as illustrated diagrammatically by way of example in the drawings affixed to this specification and forming part thereof, a shaft according to this invention requires only small diameter bearings and is capable of being inserted in a one-piece crank case.

In the drawings,

Fig. 1 is an elevation of the new crank shaft in position in the crank case, the latter as well as some parts connected with the shaft being shown in vertical section.

Fig. 2 is a cross-section on the line II—II in Fig. 1, viewed in the direction of the arrows.

Fig. 3 is an axial section of part of the shaft on the line III—III in Fig. 2.

Fig. 4 is a horizontal section of the shaft on the line IV—IV in Fig. 2.

Referring to the drawings, the shaft comprising six crank pins for the piston rods of a six-cylinder engine, is formed with seven disc-shaped cheeks 1, 2, 3, 4, 5, 6 and 7 of uniform diameter. The circumferential surfaces of the cheek discs, being bordered on both sides by flanges 8, form the inner races for the rollers 9 mounted in the cages 10 of roller bearings surrounded by rings 11, all of equal inner and outer diameter which form the outer races and fit in bearings 12 forming part of a one-piece crank case A formed with an end opening 25.

On the right-hand end journal of the shaft is mounted the flywheel 14, while a disc 15 on the left-hand end of the shaft serves for fixing and centering the oscillation absorber 16.

Fig. 2 shows the three pairs of crank pins 17—22, 18—21 and 19—20 as being staggered 120° about the axis of revolution 23 of the shaft. 24 are the lateral faces of the cheek discs, formed in the forging of the shaft and shown, as they appear before the machining, at 34 and 35 in Fig. 4. The conical power-transferring bridges 24 created by machining transmit the power from one crank pin to the other. The cheeks of each pair of adjoining discs now enclose with the crank pin an angle somewhat greater than 90°.

The crank pins are formed with axial borings 36, 37, 38, 39, 40, 41 (Fig. 2) and with transversal borings 42, 43, 44, 45, 46 and 47 crossing the axial borings and connected with them by obliquely extending borings, one of which (48) is shown in Fig. 4.

The longitudinal borings are closed by stoppers 49 (Fig. 4). Lubricant is supplied at the free end of the shaft as usual.

The surfaces of the races 1 thru 7 and the inner faces of the flanges 8 are hardened, for instance by flame hardening or by induction hardening.

Obviously any impurities, for instance carbon or metal particles, are free to escape from the bearing because the outer rings 11 have no flanges which might hinder their escape.

We wish it to be understood that we do not desire to be limited to the details shown and described, for obvious modifications will occur to a person skilled in the art.

We claim:

1. A crank shaft comprising at least three coaxial bearing discs of uniform outside diameter, cranks interposed between said bearing discs, the outer diameters of said discs being smaller than the diameter of an imaginary cylinder coaxial of the crank shaft and tangentially enveloping said cranks, each of said bearing discs having a substantially cylindrical circumferential outer surface coaxial of the crank shaft, an annular groove of rectangular cross section in said outer surface, a plurality of rollers received in said groove, the rotation axis of said rollers being parallel to the rotation axis of the crank shaft and the diameter of said rollers being greater than the depth of said groove, and bearing rings individually surrounding said bearing discs and having an internal diameter greater than the diameter of the imaginary cylinder enveloping said cranks, each of said rings having a cylindrical inner surface enveloping the rollers of the respective bearing discs and affording axial withdrawal of the crank shaft through said rings.

2. A crank shaft and crank shaft casing assembly, the crank shaft comprising at least three coaxial bearing discs of uniform outside diameter, cranks interposed between said bearing discs, the outer diameters of said discs being smaller than the diameter of an imaginary cylinder coaxial of the crank shaft and tangentially enveloping said cranks, each of said bearing discs having a substantially cylindrical circumferential outer surface coaxial of the crank shaft, an annular groove of rectangular cross section in said outer surface, a plurality of rollers received in said groove, the rotation axis of said rollers being parallel to the rotation axis of the crank shaft and the diameter of said rollers being greater than the depth of said groove, and bearing rings individually surrounding said bearing discs and having an internal diameter greater than the diameter of the imaginary cylinder enveloping said cranks, each of said rings having a cylindrical inner surface enveloping the rollers of the respective bearing discs and affording axial withdrawal of the crank shaft through said rings, said rings being mounted in the crank shaft casing, the latter having end walls at a right angle to the rotation axis of the crank shaft, and a circular aperture in at least one of said end walls coaxial of the crank shaft, the diameter of said aperture being smaller than the outside diameter and greater than the inside diameter of said bearing rings.

References Cited in the file of this patent

UNITED STATES PATENTS

| | | |
|---|---|---|
| 1,588,614 | Rockwell | June 15, 1926 |
| 1,661,181 | Junkers | Mar. 6, 1928 |
| 1,901,358 | Ryder | Mar. 14, 1933 |
| 2,525,248 | Walton | Oct. 10, 1950 |

FOREIGN PATENTS

| | | |
|---|---|---|
| 8,439 of 1907 | Great Britain | Sept. 12, 1907 |
| 352,191 | France | May 24, 1905 |